United States Patent
Yoshino et al.

(10) Patent No.: US 10,847,763 B2
(45) Date of Patent: Nov. 24, 2020

(54) PACKAGING MATERIAL FOR POWER STORAGE DEVICE, PACKAGING CASE FOR POWER STORAGE DEVICE, AND POWER STORAGE DEVICE

(71) Applicant: SHOWA DENKO PACKAGING CO., LTD., Kanagawa (JP)

(72) Inventors: Kenji Yoshino, Kanagawa (JP); Makoto Karatsu, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 99 days.

(21) Appl. No.: 15/799,437

(22) Filed: Oct. 31, 2017

(65) Prior Publication Data

US 2018/0123093 A1 May 3, 2018

(30) Foreign Application Priority Data

Oct. 31, 2016 (JP) ................................. 2016-212823

(51) Int. Cl.
  *H01M 2/08* (2006.01)
  *H01M 2/02* (2006.01)
  *H01M 10/00* (2006.01)

(52) U.S. Cl.
  CPC ............... *H01M 2/08* (2013.01); *H01M 2/02* (2013.01); *H01M 2/0275* (2013.01);
  (Continued)

(58) Field of Classification Search
  None
  See application file for complete search history.

(56) References Cited

U.S. PATENT DOCUMENTS

| | | | |
|---|---|---|---|
| 2008/0220226 A1* | 9/2008 | Koehn | B32B 27/32 428/200 |
| 2016/0172638 A1* | 6/2016 | Amano | H01M 2/0277 429/185 |
| 2018/0205047 A1* | 7/2018 | Ogihara | H01M 2/0277 |

FOREIGN PATENT DOCUMENTS

| | | | | |
|---|---|---|---|---|
| JP | 2003288865 A | | 10/2003 | |
| JP | 2005178216 A | * | 7/2005 | ............. B32B 27/32 |

(Continued)

OTHER PUBLICATIONS

Scientific and Technical Information Center (STIC) search results from B. Barham (Year: 2019).*

(Continued)

*Primary Examiner* — Victoria H Lynch
(74) *Attorney, Agent, or Firm* — Millen, White, Zelano & Branigan, PC; Ryan Pool (57) ABSTRACT

A packaging material for a power storage device includes a heat resistant resin layer 2 as an outer layer, a sealant layer 3 as an inner layer, and a metal foil layer 4 arranged between these layers. The sealant layer 3 is composed of one layer or a plurality of layers. The innermost layer 7 of the sealant layer contains a random copolymer containing propylene as a copolymerization component and another copolymerization component other than propylene, a roughening material, and a lubricant. The roughening material is composed of particles containing a thermoplastic resin. The center line average roughness Ra of the surface 7a of the innermost layer 7 is 0.05 μm to 1 μm. It can provide a packaging material for a power storage device which is excellent in formability and hard to generate white powder on the surface.

13 Claims, 3 Drawing Sheets

(52) U.S. Cl.
CPC ....... *H01M 2/0277* (2013.01); *H01M 2/0285* (2013.01); *H01M 2/0287* (2013.01); *H01M 10/00* (2013.01); *H01M 2002/0297* (2013.01)

(56) References Cited

FOREIGN PATENT DOCUMENTS

| | | | |
|---|---|---|---|
| JP | 2006318685 A | 11/2006 | |
| JP | 2013101764 A | 5/2013 | |
| JP | 2016081705 A | 5/2016 | |
| WO | WO-2005047387 A1 * | 5/2005 | ................ C08J 5/18 |

OTHER PUBLICATIONS

Machine Translation jP2003288865(A) (Year: 2003).*
Machine Translation JP2005178216(A) (Year: 2005).*
English Abstract of JP-2003288865, Publication dated Oct. 10, 2003.
Notification of Reasons for Refusal dispatched Sep. 1, 2020 in corresponding JP application 2016-212823 (pp. 1-4).

* cited by examiner

PACKAGING MATERIAL FOR POWER STORAGE DEVICE, PACKAGING CASE FOR POWER STORAGE DEVICE, AND POWER STORAGE DEVICE

BACKGROUND OF THE INVENTION

Field of the Invention

The present invention relates to a packaging material used for packaging power storage devices such as batteries and capacitors for use in mobile devices exemplified by smartphones and tablet computers, and batteries and electrostatic condensers for use in hybrid vehicles, electric vehicles, wind power generation, solar power generation, and nighttime electricity storage.

The present invention also relates to a packaging case for a power storage device in which the packaging material is used, and a power storage device in which a power storage device main body is packaged with the packaging material.

In claims and the specification of the present application, the term "center line average roughness (Ra)" means a center line average roughness (Ra) measured according to JIS B0601-2001.

Further, in claims and the specification of the present application, the term "density" means a density measured according to JIS K7112-1999 D method (density-gradient tube method).

Further, in claims and the specification of the present application, the term "melt flow rate (MFR)" means a melt flow rate measured according to JIS K7210-1-2014.

Further, in the specification of the present application, the term "swell (percent)" means a room temperature die swell percentage (%) according to the Capillary Rheometer A method defined in JIS K7199-1999.

Description of the Related Art

In recent years, with the thinning and weight reduction of a mobile electric device such as a smartphone and a tablet terminal, as a packaging material for packaging a power storage device such as a lithium ion secondary battery, a lithium polymer secondary battery, a lithium ion capacitor, and an electric double layer capacitor to be installed in such a mobile electric device, in place of a traditional metal can, a laminate composed of a heat resistant resin layer/an adhesive layer/a metal foil layer/an adhesive layer/a thermoplastic resin layer is used. Furthermore, also in a power source for use in an electric vehicle or the like or a large-sized power source, capacitor or the like for use as a storage application, it has been increased to package it with a laminate (packaging material) of the aforementioned structure. The laminate is subjected to stretch forming or deep drawing so as to be formed into a three-dimensional shape such as a substantially rectangular parallelepiped shape. By shaping the laminate into such a three-dimensional shape, an accommodation space for accommodating a power storage device main body can be secured.

In order to form such a three-dimensional shape in good condition without causing pinholes and/or breaks, it is required to improve the slipperiness of the surface of the inner sealant layer. As a packaging material for ensuring good formability by improving the slipperiness of the surface of the inner sealant layer, a laminate for a secondary battery case has been proposed in which a packaging resin film, a first adhesive layer, a chemical conversion treatment aluminum foil, a second adhesive layer, and a sealant film are sequentially laminated, wherein the sealant film is made of a random copolymer of propylene and α-olefin having an α-olefin content of 2 to 10% by weight and 1,000 to 5,000 ppm of a lubricant is contained (see Patent Document 1: Japanese Patent Application Publication No. 2003-288865).

Problems to be Solved by the Invention

However, in the above-described conventional technique, it is difficult to control the surface lubricant precipitation amount depending on the heating retention time and the storage period in the production process of the packaging material (laminated material). Therefore, although the slipperiness at the time of shaping is good, the lubricant excessively precipitates on the surface, so the lubricant is adhered to and deposited on the shaping surface of the shaping die during the shaping of the packaging material, which in turn generates white powder (white powder of the lubricant). When it becomes a state in which such white powder is adhered to and accumulated on the shaping surface, it is difficult to perform good shaping, so that it becomes necessary to perform removal of the white powder by cleaning every time the white powder is adhered and accumulated. Thus, there is a problem that the productivity of the packaging material deteriorates due to the cleaning and removing of such white powder.

Of course, if the additive amount (lubricant content rate) of the lubricant is reduced, it is possible to suppress the adhesion and deposition of the white powder. However, in this case, a problem occurs such that the lubricant precipitation amount becomes insufficient, resulting in poor formability. As described above, conventionally, it was difficult to achieve both excellent formability and suppression of occurrence of white powder on the surface of the packaging material.

SUMMARY OF THE INVENTION

The present invention has been made in view of the aforementioned technical background, and it is an object of the present invention to provide a packaging material for a power storage device, which is capable of ensuring good slipperiness at the time of shaping, excellent in formability, and less likely to cause white powder on a surface, a packaging case for a power storage device, and a power storage device.

Means for Solving the Problems

In order to attain the aforementioned object, the present invention provides the following means.

[1] A packaging material for a power storage device, comprising:

a heat resistant resin layer as an outer layer;

a sealant layer as an inner layer; and a metal foil layer arranged between the two layers, wherein the sealant layer is composed of one layer or a plurality of layers, and an innermost layer of the sealant layer contains a random copolymer containing propylene as a copolymerization component and another copolymerization component other than propylene, an roughening material, and a lubricant, the roughening material is composed of particles containing a thermoplastic resin, and a center line average roughness Ra of a surface of the innermost layer is 0.05 μm to 1 μm.

[2] The packaging material for a power storage device as recited in the aforementioned Item [1], wherein the thermoplastic resin constituting the roughening material is a high-density polyethylene resin.

[3] The packaging material for a power storage device as recited in the aforementioned Item [2], wherein a density of the high-density polyethylene resin is 0.935 g/cm$^3$ to 0.965 g/cm$^3$, and a melt flow rate of the high-density polyethylene resin at 190° C. is within a range of 0.01 g/10 min to 2 g/10 min.

[4] The packaging material for a power storage device as recited in any one of the aforementioned Item [1] to [3], wherein a content rate of the roughening material in the innermost layer of the sealant layer is 1 mass % to 30 mass %, and a content rate of the lubricant in the innermost layer exceeds 0 ppm and is equal to or less than 1,000 ppm.

[5] The packaging material for a power storage device as recited in any one of the aforementioned Items [1] to [4], wherein the lubricant is one or more lubricants selected from the group consisting of fatty acid amide, wax, silicone, and paraffin.

[6] The packaging material for a power storage device as recited in any one of the aforementioned Items [1] to [5], wherein the sealant layer is composed of a plurality of layers.

[7] The packaging material for a power storage device as recited in the aforementioned Item [6], wherein the sealant layer includes the innermost layer and a first intermediate layer laminated on a surface of the innermost layer on a side of the metal foil layer, the first intermediate layer contains an elastomer-modified olefin-based resin, the elastomer-modified olefin-based resin is composed of elastomer-modified homopolypropylene and/or an elastomer-modified random copolymer, and the elastomer-modified random copolymer is an elastomer modified product of a random copolymer containing propylene as a copolymerization component and another copolymerization component other than propylene.

[8] The packaging material for a power storage device as recited in the aforementioned Item [6], wherein the sealant layer includes the innermost layer, a first intermediate layer laminated on a surface of the innermost layer on a side of the metal foil layer, and a second intermediate layer laminated on a surface of the first intermediate layer on a side of the metal foil layer, the first intermediate layer contains an elastomer-modified olefin-based resin, the elastomer-modified olefin-based resin is composed of elastomer-modified homopolypropylene and/or an elastomer-modified random copolymer, the elastomer-modified random copolymer is an elastomer modified product of a random copolymer containing propylene as a copolymerization component and another copolymerization component other than propylene, and the second intermediate layer contains a random copolymer containing propylene as a copolymerization component and another copolymerization component other than propylene.

[9] A packaging case for a power storage device, the packaging case being composed of a shaped body of the packaging material for a power storage device as recited in any one of the aforementioned Items [1] to [8].

[10] A power storage device comprising:

a power storage device main body; and a packaging material composed of the packaging material for a power storage device as recited in any one of the aforementioned Items [1] to [8] or the packaging case of a power storage as recited in the aforementioned Item [9], wherein the power storage device main body is packaged by the packaging material.

Effects of the Invention

In the present invention, the innermost layer of the sealant layer contains a random copolymer containing propylene as a polymerization component and another polymerization component other than propylene, a roughening material, and a lubricant, and the roughening material is composed of particles containing a thermoplastic resin, and a center line average roughness Ra of a surface of the innermost layer is 0.05 μm to 1 μm. Therefore, good slipperiness can be secured during the shaping, and it is excellent in formability.

Furthermore, the center line average roughness Ra of the surface of the innermost layer is set to 0.05 μm to 1 μm by using a roughening material in combination with a lubricant (by using a roughening material in combination with a lubricant, the amount of the lubricant can be reduced than before). Therefore, white powder becomes less likely to appear on the surface 7a of the innermost layer of the sealant layer of the packaging material.

Since white powder is less likely to appear as described above, the productivity of the packaging material can be improved and sufficient sealing performance can be ensured in the heat-sealed portion after the sealant layers are heat-sealed to each other.

Further, by the combined use of the roughening material, the usage amount of the lubricant can be reduced as compared with a conventional method, so that it becomes unnecessary to adjust the bleed-out amount of the lubricant when performing, for example, an aging step. This in turn enables elimination of an aging step or shortening of the aging step, so that the productivity of the packaging material can be further improved.

Further, since the roughening material is composed of particles containing a thermoplastic resin, clogging of a filter at the time of producing the resin for the innermost layer can be reduced, which can further improve the productivity.

Further, since the roughening material is composed of particles containing a thermoplastic resin, it would not occur that the particles bite into or fall off when pressed from the outside as can be seen in silica particles.

In the invention recited in the aforementioned Item [2], since the thermoplastic resin constituting the roughening material is a high density polyethylene resin, the high density polyethylene resin enables effective roughening due to its moderately low compatibility with the random copolymer, which in turn can further improve slipperiness.

In the invention recited in the aforementioned Item [3], the slipperiness at the time of shaping can be further improved, so that the formability can be further improved.

In the invention recited in the aforementioned Item [4], the content rate of the roughening material in the innermost layer is set to 1 mass % to 30 mass %, so that excellent formability can be secured even if the content rate of the lubricant in the innermost layer is 1,000 ppm or less. In addition, since the content rate of the lubricant in the innermost layer exceeds 0 ppm and is equal to or less than 1,000 ppm, white powder becomes less likely to appear on the surface of the innermost layer of the sealant layer of the packaging material. Furthermore, since the content rate of the lubricant in the innermost layer exceeds 0 ppm and is equal to or less than 1,000 ppm, the amount of the lubricant existing on the surface of the innermost layer of the packaging material can be stabilized even during the storage (for example, fluctuation in the amount of the lubricant existing on the surface of the innermost layer due to long-term storage can be suppressed). Therefore, excellent formability can be ensured in a stable manner.

According to the invention as recited in the aforementioned item [5], as the lubricant, one or two or more lubricants selected from the group consisting of fatty acid amide, wax, silicone, and paraffin are used. Therefore, excellent slipperiness can be secured at the time of shaping and excellent formability can be secured.

In the invention recited in the aforementioned Item [6], the sealant layer is composed of a plurality of layers, and is configured such that one or a plurality of layers is laminated on a surface of the innermost layer on a side of the metal foil layer, so that, for example, the adhesive strength between the sealant layer and the metal foil layer can be improved.

In the invention recited in the aforementioned Item [7], the sealant layer is configured to include the innermost layer and the first intermediate layer having the aforementioned specific structure laminated on the surface of the innermost layer on a side of the metal foil layer. Therefore, whitening of the sealant layer at the time of shaping can be sufficiently suppressed, and sufficient sealing performance can be ensured when heat-sealed.

In the invention recited in the aforementioned Item [8], the sealant layer is configured to include the innermost layer, the first intermediate layer having the aforementioned specific structure laminated on the surface of the innermost layer on a side of the metal foil layer, and the second intermediate layer having the aforementioned specific constitution laminated on the surface of the first intermediate layer on a side of the metal foil layer. Therefore, in addition to being able to enjoy the aforementioned effects according to the invention recited in the aforementioned Item [7], it is possible to further improve the adhesive force between the sealant layer and the metal foil layer and to ensure sufficient insulation.

In the invention recited in the aforementioned Item [9], it is possible to provide a packaging case for a power storage device, which is good in shaping and less likely to occur white powder on the surface of the packaging case (the surface of the innermost layer of the sealant layer).

In the invention recited in the aforementioned Item [10], it is possible to provide a packaging material for a power storage device and/or a power storage device packaged with the packaging case, which is good in shaping and less likely to exhibit white powder on the surface of the packaging case (the surface of the innermost layer of the sealant layer).

EMBODIMENTS FOR CARRYING OUT THE INVENTION

The packaging material 1 for a power storage device according to the present invention includes a heat resistant resin layer 2 as an outer layer, a sealant layer 3 as an inner layer, and a metal foil layer 4 arranged between the two layers. The sealant layer 3 is composed of one layer or a plurality of layers. The innermost layer 7 of the sealant layer 3 contains a random copolymer containing propylene as a copolymerization component and another copolymerization component other than propylene, a roughening material, and a lubricant. The roughening material is composed of particles containing a thermoplastic resin, and a center line average roughness Ra of the surface 7a of the innermost layer 7 is 0.05 μm to 1 μm.

Figure 1:
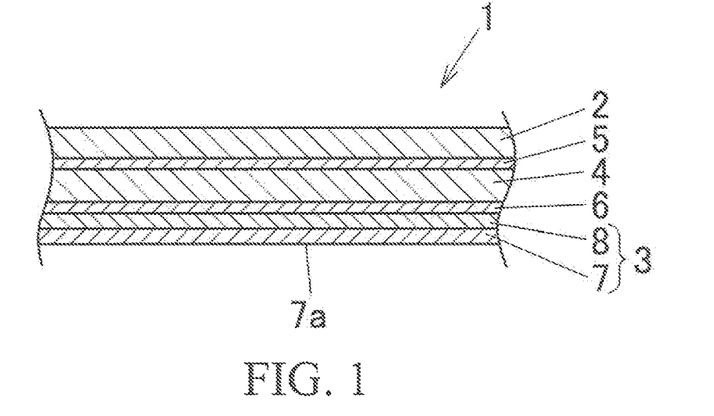
FIG. 1 is a cross-sectional view showing a first embodiment of a packaging material for a power storage device according to the present invention.
Figure 2:
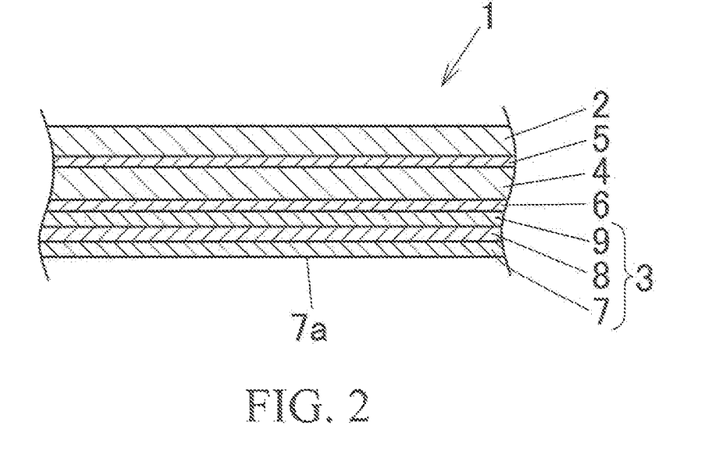
FIG. 2 is a cross-sectional view showing a second embodiment of a packaging material for a power storage device according to the present invention.
Figure 3:
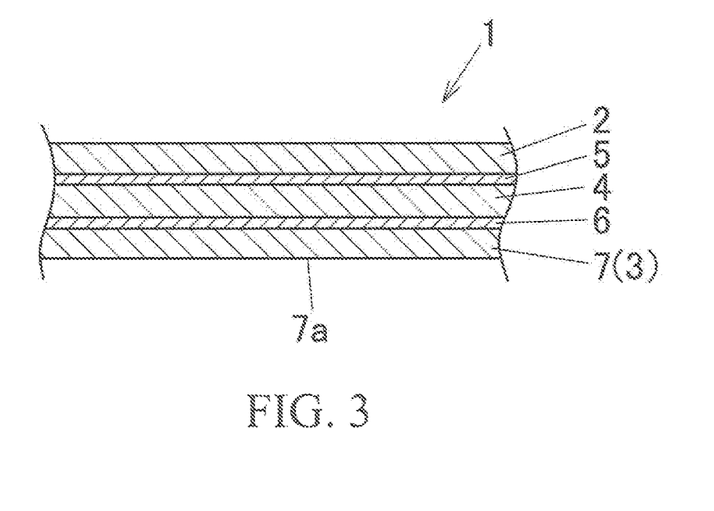
FIG. 3 is a cross-sectional view showing a third embodiment of a packaging material for a power storage device according to the present invention.

Three embodiments of the packaging material 1 for a power storage device according to the present invention are shown in FIGS. 1 to 3. It should be noted that these three embodiments are mere representative embodiments and the present invention is not intended to be particularly limited to such structures.

In all of the packaging materials 1 for a power storage device shown in FIGS. 1 to 3, it is configured such that a heat resistant resin layer (outer layer) 2 is integrally laminated on one surface (upper surface) of a metal foil layer 4 via a second adhesive layer (outer adhesive layer) 5 and a sealant layer (inner layer) 3 is integrally laminated on the other surface (lower surface) of the metal foil layer 4 via a first adhesive layer (inner adhesive layer) 6.

In the packaging material 1 for a power storage device shown in FIG. 1, the sealant layer (inner layer) 3 is composed of the innermost layer 7 and a first intermediate layer 8 laminated on the surface of the innermost layer 7 on a side of the metal foil layer 4. That is, the first intermediate layer 8 is laminated on the other surface (lower surface) of the metal foil layer 4 via a first adhesive layer (inner adhesive layer) 6, and the innermost layer 7 is laminated on the surface (lower surface) of the first intermediate layer 8. The innermost layer 7 is exposed on the inner surface of the packaging material 1 (see FIG. 1).

Further, in the packaging material 1 for a power storage device shown in FIG. 2, the sealant layer (inner layer) 3 is composed of the innermost layer 7, a first intermediate layer 8 laminated on the surface of the innermost layer 7 on the side of the metal foil layer 4, and a second intermediate layer 9 laminated on the surface of the first intermediate layer 8 on the side of the metal foil layer 4. That is, the second intermediate layer 9 is laminated on the other surface (lower surface) of the metal foil layer 4 via a first adhesive layer (inner adhesive layer) 6, the first intermediate layer 8 is laminated on the surface (lower surface) of the second intermediate layer 9, and the innermost layer 7 is laminated on the surface (lower surface) of the first intermediate layer 8. The innermost layer 7 is exposed on the inner side surface of the packaging material 1 (see FIG. 2).

Further, in the packaging material 1 for a power storage device shown in FIG. 3, the sealant layer (inner layer) 3 is composed of the innermost layer 7. That is, the sealant layer 3 composed of the innermost layer 7 is laminated on the other surface (lower surface) of the metal foil layer 4 via a first adhesive layer (inner adhesive layer) 6. The innermost layer 7 is exposed on the inner side surface of the packaging material (see FIG. 3).

In the present invention, the sealant layer (inner layer) 3 plays a role of imparting excellent chemical resistance against a highly corrosive electrolyte or the like used in a lithium ion secondary battery or the like and also imparting a heat sealing property to the packaging material.

In the present invention, the innermost layer 7 of the sealant layer 3 is configured to contain a random copolymer containing propylene as a copolymerization component and another copolymerization component other than propylene, a roughening material, and a lubricant.

The random copolymer is a random copolymer containing "propylene" and "another copolymerization component other than propylene" as copolymerization components. Regarding the random copolymer, the "another copolymerization component other than propylene" is not particularly limited, but can be exemplified by butadiene, in addition to an olefin component such as ethylene, 1-butene, 1-hexene, 1-pentene, and 4-methyl-1-pentene.

It is preferable that the melt flow rate (MFR) of the random copolymer at 230° C. (random copolymer containing propylene as a copolymerization component and another copolymerization component other than propylene) fall within a range from 1 g/10 min to 10 g/10 min. By using the random copolymer having a MFR falling within the range of 1 g/10 min to 10 g/10 min, the roughening material can be finely and uniformly dispersed. Further, the sealing performance at the time of sealing the storage device main body in the packaging material is improved, so that sufficient heat-sealing strength can be obtained and reduction in the thickness of the sealant layer after the heat-sealing can be suppressed, which in turn can improve the insulation properties.

In the case of using an ethylene-propylene random copolymer as the random copolymer, the ethylene content rate in the random copolymer is preferably 3 mass % to 7 mass %. In this case, even if heat-sealing is performed at a relatively low heat-sealing temperature of about 200° C., high heat-seal strength can be obtained. The melting point of the random copolymer is preferably within a range of 140° C. to 155° C.

The roughening material is not particularly limited, but for example, thermoplastic resin-containing pellets, thermoplastic resin-containing powders and the like may be used. Among them, a thermoplastic resin-containing powder is preferably used from the viewpoint of dispersibility. The thermoplastic resin constituting the roughening material is not particularly limited, but can be exemplified by a high density polyethylene resin, a low density polyethylene resin, an ethylene-olefin (olefin except ethylene) copolymer resin, an ethylene-vinyl ester copolymer resin, a polystyrene resins and the like. In particular, as the roughening material, it is preferable to use a roughening material containing a high density polyethylene resin. In this case, the surface 7a of the innermost layer 7 of the sealant layer can be effectively roughened without impairing the heat sealing property, thereby further improving the slipperiness.

In a state in which the roughening material particles relatively low in compatibility with respect to a matrix of the random copolymer matrix constituting the innermost layer 7 are dispersed in the matrix, the roughening material particles are partially exposed on (protruded from) the surface 7a of the innermost layer 7. Therefore, irregularities are formed on the surface 7a (the surface is roughened). For example, thermoplastic resin pellets or thermoplastic resin powders as the roughening materials are mixed to the random copolymer pellets or powders, and the mixture is melt-kneaded in an extruder or the like to finely disperse them. Thereafter, the mixture is cooled and solidified, so that irregularities (roughened surface) can be formed on the surface 7a of the innermost layer 7.

The average particle diameter of the roughening material in the dispersed state is preferably within a range of 0.05 μm to 10 μm. In this case, the slipperiness can be further improved.

The density of the high density polyethylene resin (HDPE) constituting the roughening material is preferably within a range of 0.935 g/cm$^3$ to 0.965 g/cm$^3$. In the case of such a density range, the slipperiness can be further improved, which in turn can further improve the formability. In particular, it is more preferable that the density of the high density polyethylene resin (HDPE) constituting the roughening material be within a range of 0.945 g/cm$^3$ to 0.960 g/cm$^3$.

The density of the high density polyethylene resin can be adjusted by changing the content rate of the comonomer (copolymerization component). As such a comonomer, unsaturated olefin other than ethylene such as 1-butene, 1-hexene, 1-octene, and 4-methyl-1-pentene can be exemplified, but not particularly limited thereto. As the comonomer, it is preferable to use at least one comonomer selected from the group consisting of 1-butene and 1-hexene.

It is preferable that the melt flow rate (MFR) of the high density polyethylene resin constituting the roughening material at 190° C. be within a range of 0.01 g/10 min to 2 g/10 min. When the MFR is "0.01 g/10 min" or more, the roughening material can be finely and uniformly dispersed in the random copolymer, and when the MFR is "2 g/10 min" or less, the roughness of the surface can be increased, so that the slipperiness can be further improved. In particular, it is particularly preferable that the melt flow rate (MFR) of the high density polyethylene resin (HDPE) constituting the roughening material at 190° C. be within a range of 0.1 g/10 min to 1 g/10 min.

The melt flow rate (MFR) of the high density polyethylene resin can be adjusted, for example, as follows. In the case of producing the high density polyethylene resin using a Phillips catalyst, the MFR of the high density polyethylene resin can be adjusted by changing the reactor temperature at the time of the polymerization, or the MFR of the high density polyethylene resin can be adjusted by changing the reactor temperature after adding a trace amount of hydrogen. Further, in the case of producing the high-density polyethylene resin using a Ziegler catalyst, the MFR of the high-density polyethylene resin can be adjusted by changing the amount of hydrogen supplied to the reactor at the time of the polymerization. In the case of using a Phillips catalyst, the high density polyethylene resin can be produced by slurry polymerization using isobutane as a solvent, but the method is not particularly limited to this method.

The melting point of the high density polyethylene resin constituting the roughening material is preferably within a range of 130° C. to 145° C. Further, the high-density polyethylene resin preferably has long-chain branches (carbon number is 10 or more). In the case of using a high density polyethylene resin having long-chain branches, roughening material particles can be easily formed at the time of melt-kneading the roughening material in the random copolymer. Therefore, the surface 7a of the innermost layer can be more effectively roughened, which in turn can further improve the slipperiness.

The swell of the high density polyethylene resin constituting the roughening material is preferably within a range of 25% to 55%. In this case, since the melt viscoelasticity of the resin constituting the roughening material is relatively high, particles of the high density polyethylene resin can be easily formed. Therefore, the surface 7a of the innermost layer can be more effectively roughened, which in turn can further improve the slipperiness. In particular, the swell of the high density polyethylene resin constituting the roughening material is more preferably within a range of 35% to 45%.

The term "swell" means a room temperature die swell percentage (%) according to a Capillary Rheometer A method defined in JIS K7199-1999. The swell is a value (%) obtained by the following calculation formula:

$$\text{Swell (\%)} = \{(D_1 - D_0)/D_0\} \times 100$$

where $D_1$: diameter of extruded resin,
$D_0$: standard die hole diameter (2.095 mm).

$D_1$ is defined as follows. Using a standard die (hole diameter: 2.095 mm, length: 8 mm) defined by JIS K7210-1-2014, a resin strand (string-like resin) is extruded from a capillary die at a temperature of 190° C. and a load of 2.16 kg. When the length of the strand becomes 2 cm, the strand is taken with tweezers. After naturally cooling it to be solidified, the diameter of a portion of the strand which is 1 cm away from the tip is measured with a micrometer, and the measured value is defined as $D_1$ (mm).

The high load swell (swell when the load is 21.6 kg) of the high density polyethylene resin constituting the roughening material is preferably within a range of 55% to 90%. In this case, since the melting viscoelasticity of the resin constituting the roughening material is relatively high, particles of the high density polyethylene resin can be easily formed, so that the surface 7a of the innermost layer can be roughened more effectively, which in turn can further improve the slipperiness.

The high road swell is a value obtained by the following calculation formula:

$$\text{High load swell (\%)} = \{(D_2 - D_0)/D_0\} \times 100$$

where $D_2$: diameter of extruded resin,
$D_0$: standard die hole diameter (2.095 mm), $D_2$ is defined as follows. Using a standard die (hole diameter: 2.095 mm, length: 8 mm) defined by JIS K7210-1-2014 according to JIS K7199-1999, a resin strand (string-like resin) is extruded from a capillary die at a temperature of 190° C. and a load of 21.6 kg. When the length of the strand becomes 2 cm, the strand is taken with tweezers. After naturally cooling it to be solidified, the diameter of a portion of the strand which is 1 cm away from the tip is measured with a micrometer, and the measured value is defined as $D_2$ (mm).

"High load MFR (MFR at a load of 21.6 kg)/MFR (MFR at a load of 2.16 kg)" of the high density polyethylene resin constituting the roughening material is preferably within a range of 25 to 40. In this case, the compatibility between the random copolymer and the roughening material can be secured to some extent, and whitening of the sealant layer 3 at the time of shaping can be further suppressed.

The difference between the melt density of the roughening material and the density of the roughening material is preferably within a range of 0.15 g/cm$^3$ to 0.25 g/cm$^3$. In this case, since the volumetric shrinkage rate of the roughening material increases in the process of cooling and solidifying the mixed resin from the molten state, the surface 7a of the innermost layer 7 can be efficiently roughened, so that the center line average roughness Ra can be easily adjusted to 0.05 μm to 1 μm.

In the innermost layer 7 of the sealant layer, the difference between the density of the random copolymer (random copolymer containing propylene as a copolymerization component and another copolymerization component other than propylene) and the density of the roughening material is preferably within a range of 0.04 g/cm$^3$ to 0.07 g/cm$^3$. In this case, since the difference in volume shrinkage rate between the random copolymer and the roughening material increases in the process of cooling and solidifying the mixed resin in the molten state, the irregularity of the surface 7a of the innermost layer becomes large, so that the surface of the innermost layer 7a can be more effectively roughened, which in turn can further improve the slipperiness.

Further, it is preferable that the difference between the melt density of the random copolymer (random copolymer containing propylene as a copolymerization component and another copolymerization component other than propylene) and the melt density of the roughening material be 0.3 g/cm$^3$ or less.

The content rate of the roughening material in the innermost layer 7 of the sealant layer is preferably set to 1 mass % to 30 mass %. In this case, even if the content rate of a lubricant in the innermost layer 7 is 1,000 ppm or less, excellent formability can be secured. In addition, since the content rate of the lubricant in the innermost layer exceeds 0 ppm and is equal to or less than 1,000 ppm, white powder becomes less likely to appear on the surface 7a of the innermost layer 7 of the sealant layer of the packaging material. In particular, it is particularly preferable that the content rate of the roughening material in the innermost layer 7 of the sealant layer be set to 1 mass % to 20 mass %. In addition, the content rate of the lubricant in the innermost layer 7 is preferably set so that it exceeds 0 ppm and is equal to or less than 900 ppm, more preferably set to 10 ppm to 600 ppm.

As the lubricant, although not particularly limited, it is preferable to use one or more lubricants selected from the group consisting of fatty acid amide, wax, silicone, and paraffin. Among them, as the lubricant, it is particularly preferable to use fatty acid amide. The fatty acid amide is not particularly limited, but can be exemplified by erucic acid amide and behenic acid amide.

In the present invention, an anti-blocking agent may be contained in the innermost layer 7 as long as the effects of the present invention is not impaired (see Example 10).

In the present invention, the center line average roughness Ra of the surface 7a of the innermost layer 7 is set to 0.05 μm to 1 μm. It is, however, preferable that the center line average roughness Ra of the surface 7a of the innermost layer 7 be set to 0.1 μm to 1 μm. Further, the thickness of the innermost layer 7 is preferably set to 2 μm to 40 μm.

In the case of adopting a structure in which the sealant layer 3 is provided with the first intermediate layer 8, it is preferable to use an elastomer-modified olefin-based resin as the resin constituting the first intermediate layer 8.

The elastomer-modified olefin-based resin (polypropylene block copolymer) is preferably composed of elastomer-modified homopolypropylene and/or an elastomer-modified random copolymer.

The elastomer-modified random copolymer is an elastomer modified product of a random copolymer containing "propylene" as a copolymerization component and "another copolymerization component other than propylene". The "another copolymerization component other than propylene" is not particularly limited, but can be exemplified by butadiene, in addition to olefin components such as ethylene, 1-butene, 1-hexene, 1-pentene, and 4-methyl-1-pentene.

The elastomer is not particularly limited, but an olefinic thermoplastic elastomer is preferably used. The olefinic thermoplastic elastomer is not particularly limited, but can be exemplified by an EPR (ethylene propylene rubber), a propylene-butene elastomer, a propylene-butene-ethylene elastomer, and an EPDM (ethylene-propylene-diene rubber). Among them, an EPR (ethylene propylene rubber) is preferably used.

With respect to the elastomer-modified olefin-based resin, the embodiment of the "elastomer modification" may be an embodiment in which an elastomer is graft polymerized, an embodiment in which an elastomer is added to an olefin-based resin (homopolypropylene and/or the aforementioned random copolymer), or other modified embodiments.

In the case of adopting a structure in which the sealant layer 3 is provided with the first intermediate layer 8, it is preferable that the first intermediate layer 8 contain a lubricant. As this a lubricant, examples similar to those exemplified as a lubricant to be contained in the innermost layer 7 can be exemplified. Further, it is preferable that the thickness of the first intermediate layer 8 be set to 10 µm to 60 µm.

In the case of adopting a structure in which the sealant layer 3 is provided with the second intermediate layer 9, as the resin constituting the second intermediate layer 9, it is preferable to use a random copolymer containing "propylene" and "another copolymerizable component other than propylene" as a copolymerizable component. Regarding the random copolymer, the "another copolymerization component other than propylene" is not particularly limited, but can be exemplified by butadiene, in addition to olefin components such as ethylene, 1-butene, 1-hexene, 1-pentene, and 4-methyl-1-pentene.

In the case of adopting a structure in which the sealant layer 3 is provided with the second intermediate layer 9, it is preferable that the second intermediate layer 9 contain a lubricant. As this lubricant, examples similar to those exemplified as a lubricant contained in the innermost layer 7 can be exemplified. Further, it is preferable that the thickness of the second intermediate layer 9 be set to 2 µm to 40 µm.

In the present invention, as the heat resistant resin constituting the heat resistant resin layer (outer layer) 2, a heat resistant resin which does not melt at the heat sealing temperature when heat-sealing a packaging material is used. As the heat resistant resin, it is preferable to use a heat resistant resin having a melting point higher than the melting point of the sealant layer 3 by 10° C. or more. It is particularly preferable to use a heat resistant resin having a melting point higher by 20° C. or more than the melting point of the sealant layer 3.

The heat resistant resin layer (outer layer) 2 is not particularly limited, but can be exemplified by a polyamide film such as a nylon film and a polyester film, and these stretched films are preferably used. Among them, as the heat resistant resin layer 2, it is particularly preferable to use a biaxially stretched polyamide film such as a biaxially stretched nylon film, a biaxially stretched polybutylene terephthalate (PBT) film, a biaxially stretched polyethylene terephthalate (PET) film, or a biaxially stretched polyethylene naphthalate (PEN) film. The nylon film is not particularly limited, but can be exemplified by a 6 nylon film, a 6,6 nylon film, and an MXD nylon film.

The heat resistant resin layer 2 may be formed of a single layer or may be formed of multiple layers (e.g., a multilayer of a PET film/a nylon film) made of, for example, a polyester film/a polyamide film. In the case of a multilayer, it is preferable to arrange the polyester film on the outermost side.

The thickness of the outer layer 2 is preferably 2 µm to 50 µm. In the case of using a polyester film, it is preferable that the thickness be 5 µm to 40 µm, and in the case of using a nylon film, it is preferable that the thickness be 15 µm to 50 µm. By setting the thickness to a value equal to or larger than the aforementioned preferred lower limit value, it is possible to ensure a sufficient strength as a packaging material. By setting the thickness to a value equal to or smaller than the aforementioned preferred upper limit, it is possible to reduce the stress at the time of shaping such as stretch forming and drawing, thereby improving the formability.

In the present invention, the metal foil layer 4 plays a role of imparting a gas barrier property to prevent invasion of oxygen and moisture into the packaging material 1. The metal foil layer 4 is not particularly limited, but can be exemplified by an aluminum foil, a SUS foil (stainless steel foil), a copper foil, and a nickel foil. Among them, it is preferable to use an aluminum foil. The thickness of the metal foil layer 4 is preferably 15 µm to 100 µm. By setting the thickness to 15 µm or more, it is possible to prevent generation of pinholes at the time of rolling when manufacturing a metal foil, and by setting the thickness to 100 µm or less, it is possible to reduce the stress at the time of shaping such as stretch forming and drawing, thereby improving the formability. In particular, the thickness of the metal foil layer 4 is more preferably 15 µm to 45 µm.

As the aluminum foil, an A8079-O-material (annealed aluminum material) defined by JIS H4160: 2006, and an A8021-O-material (annealed aluminum material) defined by JISH4160: 2006 are suitable.

It is preferable that the metal foil layer 4 be subjected to a chemical conversion treatment at least on the inner surface (the surface on the second adhesive layer 6 side). By being subjected to such chemical conversion treatment, corrosion of the surface of the metal foil due to contents (electrolyte of a battery, etc.) can be prevented sufficiently. As such a chemical conversion treatment, for example, a chromate treatment can be exemplified.

As the first adhesive layer (outer adhesive layer) 5, the first adhesive layer is not particularly limited, but can be exemplified by a polyurethane polyolefin adhesive layer, a polyurethane adhesive layer, a polyester polyurethane adhesive layer, and a polyether polyurethane adhesive layer. The thickness of the first adhesive layer 5 is preferably set to 1 µm to 6 µm.

As the second adhesive layer (inner adhesive layer) 6, although not particularly limited, for example, one exemplified as the first adhesive layer 5 can be used. It is, however, preferable to use a polyolefin adhesive with less swelling due to electrolytes. Among these, it is particularly preferable to use an acid-modified polyolefin-based adhesive. For examples, as the acid-modified polyolefin-based adhesive, a maleic acid-modified polypropylene adhesive and a fumaric acid-modified polypropylene adhesive can be exemplified. The thickness of the second adhesive layer 6 is preferably set to 1 µm to 5 µm.

According to the present invention, with the above-described structure, the amount of the lubricant existing on (adhering to) the surface 7a of the innermost layer 7 of the sealant layer 3 is within a range of 0.1 µg/cm$^2$ to 0.6 µg/cm$^2$. Among them, the lubricant amount existing on the surface 7a of the innermost layer 7 is more preferably within a range of 0.1 µg/cm$^2$ to 0.3 µg/cm$^2$.

In addition, according to the present invention, with the above-described structure, it is preferable that the amount of the lubricant existing on (adhering to) the surface (outer surface) of the outer layer 2 be within a range of 0.1 μg/cm² to 0.6 μg/cm². Among them, it is more preferable that the amount of the lubricant existing on the surface of the outer layer 2 be within a range of 0.1 μg/cm² to 0.3 μg/cm².

Further, in the present invention, with the above-described structure, it is preferable that the dynamic friction coefficient of the surface 7a of the innermost layer 7 of the sealant layer 3 be 0.3 or less.

Figure 5:
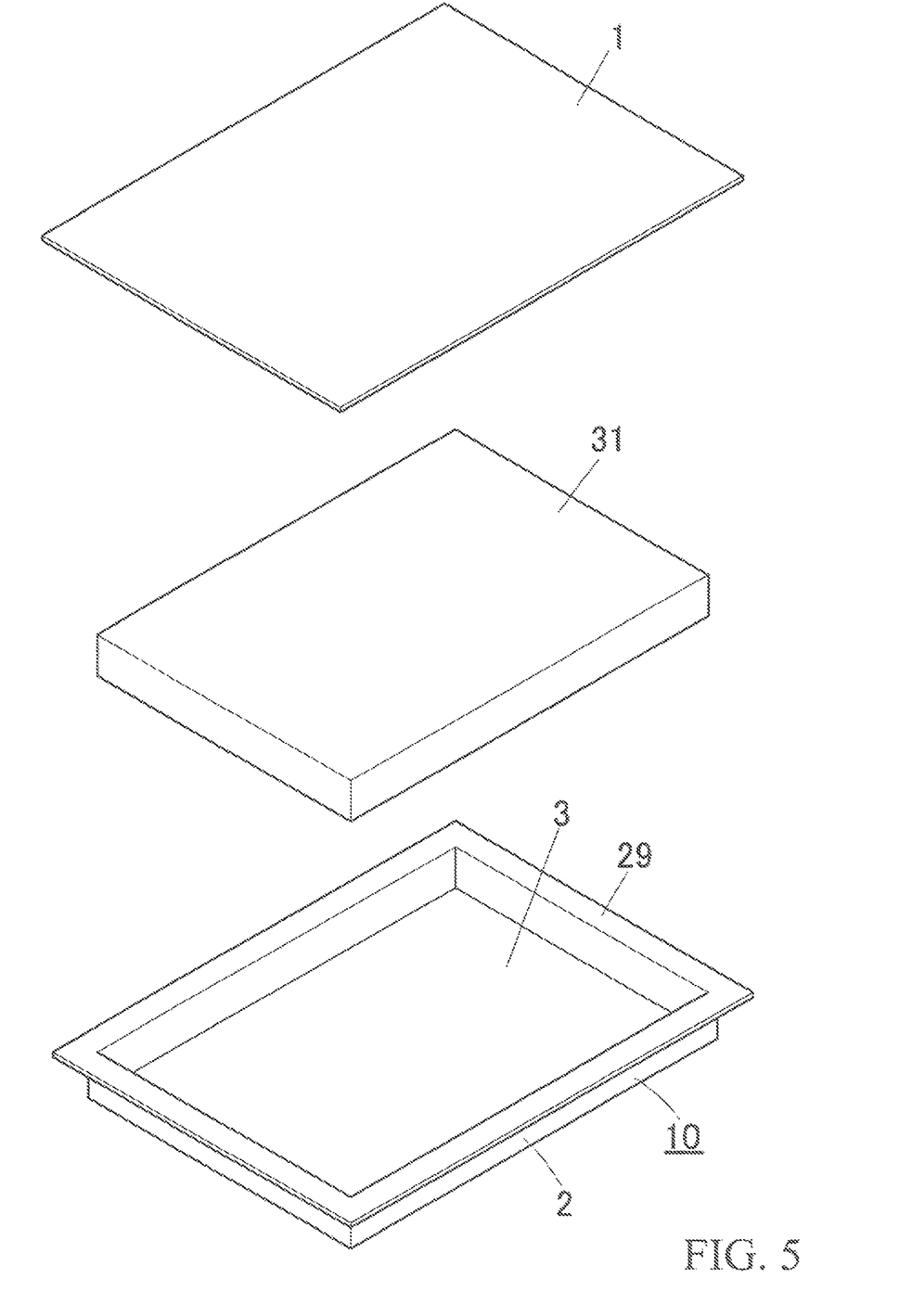
FIG. 5 is a perspective view showing a packaging material (planar shape), a power storage device main body, and a packaging case (three-dimensionally shaped body) constituting the power storage device of FIG. 4 in a state before heat-sealing them.

By shaping (deep drawing, stretch forming, etc.) the packaging material 1 for a power storage device of the present invention, a packaging case 10 for a power storage device can be obtained (see FIG. 5). The packaging material 1 of the present invention can be used as it is without being subjected to shaping (see FIG. 5).

Figure 4:
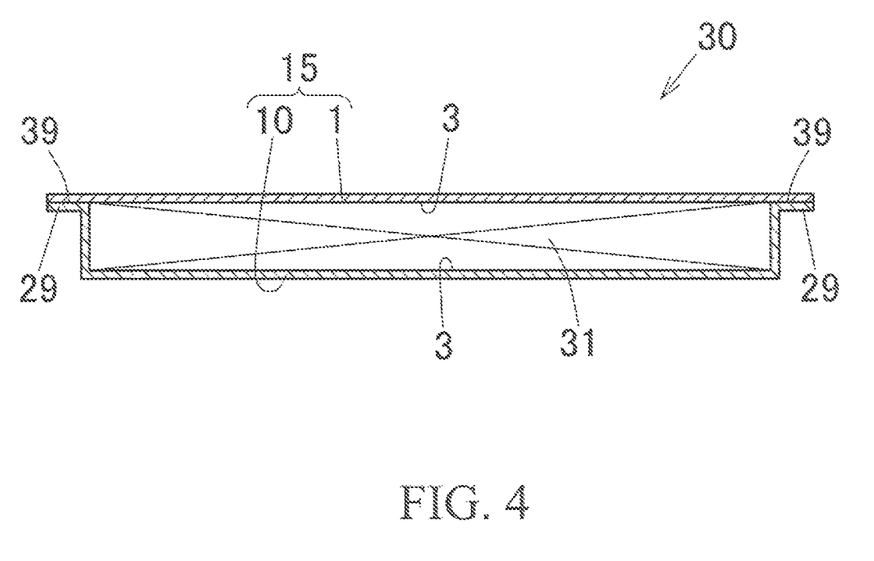
FIG. 4 is a cross-sectional view showing one embodiment of a power storage device according to the present invention.

FIG. 4 shows an embodiment of a power storage device 30 configured using the packaging material 1 of the present invention. This power storage device 30 is a lithium ion secondary battery. In this embodiment, as shown in FIGS. 4 and 5, a packaging member 15 is constituted by a case 10 obtained by shaping the packaging material 1 and a planar packaging material 1 not subjected to shaping. The power storage device 30 of the present invention is constituted (see FIGS. 4 and 5) by accommodating a substantially rectangular parallelepiped power storage device main body (electrochemical element or the like) 31 in an accommodation recess of an packaging case 10 obtained by shaping the packaging material 1 of the present invention, arranging a packaging material 1 of the present invention on the power storage device main body 31 without being shaped with its inner layer 3 side facing inward (lower side), and heat-sealing the peripheral portion of the inner layer 3 of the planar packaging material 1 and the inner layer 3 of the flange portion (sealing peripheral portion) 29 of the packaging case 10 to be heat-sealed.

The inner side surface of the accommodation recess of the packaging case 10 is an inner layer (sealant layer) 3, and the outer surface of the accommodation recess is an outer layer (heat resistant resin layer) 2 (see FIG. 5).

In FIG. 4, the reference numeral "39" denotes a heat-sealed portion in which the peripheral portion of the packaging material 1 and the flange portion (sealing peripheral portion) 29 of the packaging case 10 are joined (heat-sealed). In the power storage device 30, a tip end portion of a tab lead connected to the power storage device main body portion 31 is led to the outside of the packaging member 15, but the illustration is omitted.

Although not particularly limited, the power storage device main body 31 can be exemplified by a battery main body portion, a capacitor main body portion, and an electrical condenser main body portion.

It is preferable that the width of the heat seal portion 39 be set to 0.5 mm or more. When it is set to 0.5 mm or more, sealing can be reliably performed. In particular, it is preferable that the width of the heat seal portion 39 be set to 3 mm to 15 mm.

In the above embodiment, the packaging member 15 is composed of the packaging case 10 obtained by shaping the packaging material 1 and the planar packaging material 1 (see FIGS. 4 and 5). However, the present invention is not particularly limited to such a combination. For example, the packaging member 15 may be constituted by a pair of packaging materials 1, or may be constituted by a pair of packaging cases 10.

EXAMPLES

Next, specific examples of the present invention will be described, but the present invention is not particularly limited to those of the examples.

Example 1

A chemical conversion treatment solution containing phosphoric acid, polyacrylic acid (acryl-based resin), a chromium (III) salt compound, water, and alcohol was applied to both sides of an aluminum foil 4 having a thickness of 40 μm and dried at 180° C. to form a chemical conversion coating. The chromium adhesion amount of this chemical conversion coating was 10 mg/m² per one side.

Next, a biaxially stretched 6 nylon film 2 having a thickness of 25 μm was dry-laminated (adhered) to one surface of the aluminum conversion-treated aluminum foil 4 via a two-part curing type urethane-based adhesive 5.

Co-extrusion was performed using a T-die so that three layers, i.e., a second intermediate layer film (second intermediate layer) 9 having a thickness of 6 μm and containing an ethylene-propylene random copolymer and 500 ppm of erucic acid amide, a first intermediate layer film (first intermediate layer) 8 having a thickness of 28 μm and containing an elastomer-modified olefin resin (block PP) and 500 ppm of erucamide, and an innermost layer film (innermost layer) 7 having a thickness of 6 μm and containing an ethylene-propylene random copolymer, 1.0 mass % of high density polyethylene resin powder (roughening material), and 500 ppm of erucic acid amide, were laminated in this order. Thus, a sealant film (second intermediate layer film 9/first intermediate layer film 8/innermost layer film 7) 3 having a thickness of 40 μm in which these three layers were laminated was obtained. The surface of the second intermediate layer film 9 of the sealant film 3 was superimposed on the other surface of the aluminum foil 4 after the dry lamination via a two-part curing type maleic acid-modified polypropylene adhesive 6, and sandwiched between a rubber nip roll and a laminate roll heated to 100° C. and crimped to be dry laminated. Thereafter, aging (heating) at 40° C. was performed for 10 days. Thus, a packaging material 1 for a power storage device having the structure shown in FIG. 2 was obtained. The center line average roughness Ra of the surface 7a of the innermost layer 7 of the sealant layer 3 of the obtained packaging material 1 for a power storage device was 0.13 μm.

Using a mixed adhesive solution in which 100 parts by mass of maleic acid-modified polypropylene (melting point: 80° C., acid value: 10 mg KOH/g) as a main agent, 8 parts by mass of an isocyanurate form of hexamethylene diisocyanate (NCO content rate: 20 mass %) as a curing agent, and a solvent were mixed as the two-part curing type maleic acid-modified polypropylene adhesive, the adhesive solution was applied on the other surface of the aluminum foil 4 so that the coating amount of the solid content became 2 g/m², and after drying by heating, superimposed on the surface of the second intermediate layer film 9 of the sealant film 3.

In the high density polyethylene resin (roughening material), the MFR was 0.2 g/10 min at 190° C., and the density was 0.963 g/cm³, and the swell was 40%. The high density polyethylene resin was produced by a slurry loop process using a Phillips catalyst.

Example 2

A packaging material 1 for a power storage device having the structure shown in FIG. 2 was obtained in the same manner as in Example 1 except that the content rate of the high density polyethylene resin (roughening material) in the innermost layer film (innermost layer) 7 was changed from 1.0 mass % to 5.0 mass %.

Example 3

A packaging material 1 for a power storage device having the structure shown in FIG. 2 was obtained in the same manner as in Example 2 except that behenic acid amide was used instead of erucic acid amide as a lubricant to be contained in the second intermediate layer film 9, the first intermediate layer film 8, and the innermost layer film 7.

Example 4

A packaging material 1 for a power storage device having the structure shown in FIG. 2 was obtained in the same manner as in Example 2 except that the content rate of erucic acid amide in the innermost layer film (innermost layer) 7 was changed from 500 ppm to 1,000 ppm.

Example 5

A packaging material 1 for a power storage device having the structure shown in FIG. 2 was obtained in the same manner as in Example 1 except that the content rate of the high density polyethylene resin (roughening material) in the innermost layer film (innermost layer) 7 was changed from 1.0 mass % to 10.0 mass %.

Example 6

A packaging material 1 for a power storage device having the structure shown in FIG. 2 was obtained in the same manner as in Example 1 except that the content rate of the high density polyethylene resin (roughening material) in the innermost layer film (innermost layer) 7 was changed to 1.0 mass % to 15.0 mass %.

Example 7

A packaging material 1 for a power storage device having the structure shown in FIG. 2 was obtained in the same manner as in Example 1 except that the content rate of the high density polyethylene resin (roughening material) in the innermost layer film (innermost layer) 7 was changed from 1.0 mass % to 20.0 mass %.

Example 8

A packaging material 1 for a power storage device having the structure shown in FIG. 2 was obtained in the same manner as in Example 1 except that the content rate of the high density polyethylene resin (roughening material) in the innermost layer film (innermost layer) 7 was changed from 1.0 mass % to 30.0 mass %.

Example 9

A packaging material 1 for a power storage device having the structure shown in FIG. 2 was obtained in the same manner as in Example 1 except that the content rate of the high density polyethylene resin (roughening material) in the innermost layer film (innermost layer) 7 was changed from 1.0 mass % to 35.0 mass %.

Example 10

A packaging material 1 for a power storage device having the structure shown in FIG. 2 was obtained in the same manner as in Example 3 except that 2,500 ppm of acrylic beads was further contained as an anti-blocking agent (AB agent) in the innermost layer film (innermost layer) 7.

Example 11

A packaging material 1 for a power storage device having the structure shown in FIG. 2 was obtained in the same manner as in Example 4 except that a high density polyethylene resin (roughening material) having an MFR of 0.2 g/10 min, a density of 0.945 g/cm$^3$, a swell ratio of 35 and produced using a Phillips catalyst by a slurry loop process was used as a high density polyethylene resin (roughening material) to be contained in the innermost layer film (innermost layer) 7.

Example 12

A packaging material 1 for a power storage device having the structure shown in FIG. 2 was obtained in the same manner as in Example 5 except that a high density polyethylene resin (roughening material) having an MFR of 0.2 g/10 min, a density of 0.955 g/cm$^3$, a swell ratio of 45 and produced using a Phillips catalyst by a slurry loop process was used as a high density polyethylene resin (roughening material) to be contained in the innermost layer film (innermost layer) 7.

Example 13

A packaging material 1 for a power storage device having the structure shown in FIG. 2 was obtained in the same manner as in Example 6 except that a high density polyethylene resin (roughening material) having an MFR of 2 g/10 min at 190° C., a density of 0.954 g/cm$^3$, a swell ratio of 30 and produced using a Ziegler catalyst by a slurry loop process was used as a high density polyethylene resin (roughening material) to be contained in the innermost layer film (innermost layer) 7.

Example 14

A packaging material 1 for a power storage device having the structure shown in FIG. 2 was obtained in the same manner as in Example 7 except that a high density polyethylene resin (roughening material) having an MFR of 3 g/10 min at 190° C., a density of 0.955 g/cm$^3$, a swell ratio of 20 and produced using a Ziegler catalyst by a slurry loop process was used as a high density polyethylene resin (roughening material) to be contained in the innermost layer film (innermost layer) 7.

Example 15

A packaging material 1 for a power storage device having the structure shown in FIG. 2 was obtained in the same manner as in Example 5 except that a low density polyethylene resin (roughening material) having an MFR of 2 g/10 min at 190° C., a density of 0.921 g/cm$^3$, a swell ratio of 20 and produced using a Ziegler catalyst in vapor-phase fluidized bed was used as a roughening material to be contained in the innermost layer film (innermost layer) 7 in place of a high density polyethylene resin.

Example 16

A packaging material 1 for a power storage device having the structure shown in FIG. 2 was obtained in the same manner as in Example 5 except that a low density polyethylene resin having an MFR of 3 g/10 min at 190° C., a density of 0.915 g/cm³, a swell ratio of 35 and produced in a high pressure autoclave using a peroxide catalyst was used as a roughening material to be contained in the innermost layer film (innermost layer) 7 in place of a high density polyethylene resin.

Example 17

A packaging material 1 for a power storage device having the structure shown in FIG. 1 was obtained in the same manner as in Example 1 except that a sealant film (first intermediate layer film 8/innermost layer film 7) 3 having a thickness of 40 µm obtained by performing co-extrusion using a T-die so that two layers, i.e., a first intermediate layer film (first intermediate layer) 8 having a thickness of 32 µm and containing an elastomer-modified olefin-based resin (block PP) and 500 ppm of erucic acid amide, and an innermost layer film (innermost layer) 7 having a thickness of 8 µm and containing an ethylene-propylene random copolymer, 10.0 mass % of a high-density polyethylene resin (roughing material), and 500 ppm of erucic acid amide, were laminated in this order, and the surface of the first intermediate layer film 8 of the sealant film 3 was superimposed on the other surface of the aluminum foil 4 after the dry lamination via the two-part curing type maleic acid-modified polypropylene adhesive 6.

Example 18

A packaging material 1 for a power storage device having a structure shown in FIG. 3 was obtained in the same manner as in Example 1 except that as a sealant film, a sealant film 3 (sealant film including only the innermost layer film 7) having a thickness of 40 µm obtained by extruding a composition containing an ethylene-propylene random copolymer, 10.0 mass % of a high density polyethylene resin (roughening material), and 500 ppm of erucic acid amide using a T die was used and the sealant film 3 was superimposed on the other surface of the aluminum foil 4 after dry lamination via a two-part curing type maleic acid-modified polypropylene adhesive 6.

Comparative Example 1

A packaging material for a power storage device was obtained in the same manner as in Example 3 except that the roughening material (high density polyethylene resin) was not contained in the innermost layer film (innermost layer) 7.

Reference Example 1

A packaging material for a power storage device was obtained in the same manner as in Example 1 except that the content rate of erucic acid amide in the second intermediate layer film (second intermediate layer) 9 was changed from 500 ppm to 1,000 ppm and the content rate of erucic acid amide in the first intermediate layer film (first intermediate layer) 8 was changed from 500 ppm to 1,000 ppm, and a film containing an ethylene-propylene random copolymer, 1,000 ppm erucic acid amide, and 2,500 ppm of silica particles (anti-blocking agent) was used as the innermost layer film (innermost layer) 7.

Reference Example 2

A packaging material for a power storage device was obtained in the same manner as in Reference Example 1 except that the content rate of erucic acid amide of the first intermediate layer film (first intermediate layer) 8 was changed from 1,000 ppm to 2,500 ppm.

Reference Example 3

A packaging material for a power storage device was obtained in the same manner as in Reference Example 1 except that the content rate of erucic acid amide of the first intermediate layer film (first intermediate layer) 8 was changed from 1,000 ppm to 5,000 ppm.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Second Intermediate layer | | Constituent resin | Random PP | Random PP | Random PP | Random PP | Random PP | Random PP | Random PP |
| | | Lubricant content (ppm) (ppm) (ppm) | 500 | 500 | 500 | 500 | 500 | 500 | 500 |
| First intermediate layer | | Constituent resin | Block PP | Block PP | Block PP | Block PP | Block PP | Block PP | Block PP |
| | | Lubricant content (ppm) | 500 | 500 | 500 | 500 | 500 | 500 | 500 |
| Innermost layer | | Constituent resin | Random PP | Random PP | Random PP | Random PP | Random PP | Random PP | Random PP |
| | Roughening material | Type of polyethylene | High density | High density | High density | High density | High density | High density | High density |
| | | MFR at 190° C. (g/10 min) | 0.2 | 0.2 | 0.2 | 0.2 | 0.2 | 0.2 | 0.2 |
| | | Density (g/cm³) | 0.963 | 0.963 | 0.963 | 0.963 | 0.963 | 0.963 | 0.963 |
| | | Swell percent (%) | 40 | 40 | 40 | 40 | 40 | 40 | 40 |
| | | Catalyst | Phillips | Phillips | Phillips | Phillips | Phillips | Phillips | Phillips |
| | | Process | Slurry | Slurry | Slurry | Slurry | Slurry | Slurry | Slurry |
| | | Content (mass %) of roughening material in innermost layer | 1.0 | 5.0 | 5.0 | 5.0 | 10.0 | 15.0 | 20.0 |
| | | Types of lubricant | Erucic acid amide | Erucic acid amide | Behenic acid amide | Erucic acid amide | Erucic acid amide | Erucic acid amide | Erucic acid amide |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
|  | Content of lubricant (ppm) in innermost layer | 500 | 500 | 500 | 1000 | 500 | 500 | 500 |
|  | Content of AB agent (ppm) in innermost layer | — | — | — | — | — | — | — |
|  | Ra (µm) of surface of innermost layer | 0.13 | 0.18 | 0.18 | 0.18 | 0.25 | 0.34 | 0.45 |
|  | Amount of lubricant (µg/cm$^2$) existing on outer layer surface | 0.10 | 0.10 | 0.10 | 0.20 | 0.10 | 0.10 | 0.10 |
|  | Amount of lubricant (µg/cm$^2$) existing on innermost layer surface | 0.15 | 0.15 | 0.15 | 0.31 | 0.15 | 0.15 | 0.15 |
|  | coefficient of dynamic friction of surface of innermost layer | 0.15 | 0.15 | 0.15 | 0.15 | 0.13 | 0.15 | 0.16 |
| Evaluation | Formability | ◎ | ◎ | ◎ | ◎ | ◎ | ◎ | ◎ |
|  | Presence or absence of white powder | ○ | ○ | ○ | ○ | ○ | ○ | ○ |
|  | Presence or absence of whitening during shaping | ◎ | ◎ | ◎ | ◎ | ◎ | ◎ | ◎ |

TABLE 2

|  |  |  | Ex. 8 | Ex. 9 | Ex. 10 | Ex. 11 | Ex. 12 | Ex. 13 | Ex. 14 |
|---|---|---|---|---|---|---|---|---|---|
| Second Intermediate layer |  | Constituent resin | Random PP | Random PP | Random PP | Random PP | Random PP | Random PP | Random PP |
|  |  | Lubricant content (ppm) (ppm) | 500 | 500 | 500 | 500 | 500 | 500 | 500 |
| First intermediate layer |  | Constituent resin | Block PP | Block PP | Block PP | Block PP | Block PP | Block PP | Block PP |
|  |  | Lubricant content (ppm) | 500 | 500 | 500 | 500 | 500 | 500 | 500 |
| Innermost layer |  | Constituent resin | Random PP | Random PP | Random PP | Random PP | Random PP | Random PP | Random PP |
|  | Roughening material | Type of polyethylene | High density | High density | High density | High density | High density | High density | High density |
|  |  | MFR at 190° C. (g/10 min) | 0.2 | 0.2 | 0.2 | 0.2 | 0.2 | 2 | 3 |
|  |  | Density (g/cm$^3$) | 0.963 | 0.963 | 0.963 | 0.945 | 0.955 | 0.954 | 0.955 |
|  |  | Swell percent (%) | 40 | 40 | 40 | 35 | 45 | 30 | 20 |
|  |  | Catalyst | Phillips | Phillips | Phillips | Phillips | Phillips | Ziegler | Ziegler |
|  |  | Process | Slurry | Slurry | Slurry | Slurry | Slurry | Slurry | Slurry |
|  |  | Content (mass %) of roughening material in innermost layer | 30.0 | 35.0 | 5.0 | 5.0 | 10.0 | 15.0 | 20.0 |
|  |  | Types of lubricant | Erucic acid amide | Erucic acid amide | Behenic acid amide | Erucic acid amide | Erucic acid amide | Erucic acid amide | Erucic acid amide |
|  |  | Content of lubricant (ppm) in innermost layer | 500 | 500 | 500 | 1000 | 500 | 500 | 500 |
|  |  | Content of AB agent (ppm) in innermost layer | — | — | 2500 | — | — | — | — |
|  |  | Ra (µm) of surface of innermost layer | 0.55 | 0.60 | 0.18 | 0.15 | 0.15 | 0.10 | 0.07 |
|  |  | Amount of lubricant (µg/cm$^2$) existing on outer layer surface | 0.10 | 0.10 | 0.10 | 0.20 | 0.10 | 0.10 | 0.10 |
|  |  | Amount of lubricant (µg/cm$^2$) existing on innermost layer surface | 0.15 | 0.15 | 0.15 | 0.31 | 0.15 | 0.15 | 0.15 |
|  |  | coefficient of dynamic friction of surface of innermost layer | 0.13 | 0.15 | 1.15 | 0.15 | 0.15 | 0.35 | 0.35 |
| Evaluation |  | Formability | ◎ | ◎ | ◎ | ◎ | ◎ | ◎ | ○ |
|  |  | Presence or absence of white powder | ○ | ○ | ○ | ○ | ○ | ○ | ○ |
|  |  | Presence or absence of whitening during shaping | ○ | ◎ | ◎ | ◎ | ◎ | ◎ | ◎ |

TABLE 3

|  |  |  | Ex. 15 | Ex. 16 | Comp. Ex. 1 | Ref. Ex. 1 | Ref. Ex. 2 | Ref. Ex. 3 |
|---|---|---|---|---|---|---|---|---|
| Second Intermediate layer |  | Constituent resin | Random PP | Random PP | Random PP | Random PP | Random PP | Random PP |
|  |  | Lubricant content (ppm) (ppm) | 500 | 500 | 500 | 1000 | 1000 | 1000 |
| First intermediate layer |  | Constituent resin | Block PP | Block PP | Block PP | Block PP | Block PP | Block PP |
|  |  | Lubricant content (ppm) (ppm) | 500 | 500 | 500 | 1000 | 2500 | 5000 |

TABLE 3-continued

|  |  | Ex. 15 | Ex. 16 | Comp. Ex. 1 | Ref. Ex. 1 | Ref. Ex. 2 | Ref. Ex. 3 |
|---|---|---|---|---|---|---|---|
| Innermost layer | Constituent resin | Random PP | Random PP | Random PP | Random PP | Random PP | Random PP |
| Roughening material | Type of polyethylene | Low density | Low density |  |  |  |  |
|  | MFR at 190° C. (g/10 min) | 2 | 3 |  |  |  |  |
|  | Density (g/cm³) | 0.921 | 0.915 |  |  |  |  |
|  | Swell percent (%) | 20 | 35 |  |  |  |  |
|  | Catalyst | Ziegler | Peroxide |  |  |  |  |
|  | Process | Vapor phase process fluidized bed | High Pressure Method Autoclave |  |  |  |  |
| Content (mass %) of roughening material in innermost layer |  | 10.0 | 10.0 |  |  |  |  |
| Types of lubricant |  | Erucic acid amide | Erucic acid amide | Behenic acid amide | Erucic acid amide | Erucic acid amide | Erucic acid amide |
| Content of lubricant (ppm) in innermost layer |  | 500 | 500 | 500 | 1000 | 1000 | 1000 |
| Content of AB agent (ppm) in innermost layer |  | — | — | — | 2500 | 2500 | 2500 |
| Ra (µm) of surface of innermost layer |  | 0.07 | 0.07 | 0.03 | 0.13 | 0.13 | 0.13 |
| Amount of lubricant (µg/cm²) existing on outer layer surface |  | 0.10 | 0.10 | 0.10 | 0.20 | 0.35 | 0.65 |
| Amount of lubricant (µg/cm²) existing on innermost layer surface |  | 0.15 | 0.15 | 0.15 | 0.25 | 0.44 | 0.95 |
| coefficient of dynamic friction of surface of innermost layer |  | 0.35 | 0.40 | 0.85 | 0.28 | 0.24 | 0.21 |
| Evaluation | Formability | ○ | ○ | X | ◎ | ◎ | ◎ |
|  | Presence or absence of white powder | ○ | ○ | ○ | ○ | ○ | X |
|  | Presence or absence of whitening during shaping | ◎ | ◎ | ◎ | ◎ | ◎ | ◎ |

TABLE 4

|  |  | Ex. 17 | Ex. 18 |
|---|---|---|---|
| Second Intermediate layer | Constituent resin |  |  |
|  | Lubricant content (ppm) |  |  |
| First intermediate layer | Constituent resin | Block PP |  |
|  | Lubricant content (ppm) | 500 |  |
| Innermost layer | Constituent resin | Random PP | Random PP |
| Roughening material | Type of polyethylene | High density | High density |
|  | MFR at 190° C. (g/10 min) | 0.2 | 0.2 |
|  | Density (g/cm³) | 0.963 | 0.963 |
|  | Swell percent (%) | 40 | 40 |
|  | Catalyst | Phillips | Phillips |
|  | Process | Slurry | Slurry |
| Content (mass %) of roughening material in innermost layer |  | 10.0 | 10.0 |
| Types of lubricant |  | Erucic acid amide | Erucic acid amide |
| Content of lubricant (ppm) in innermost layer |  | 500 | 500 |
| Content of AB agent (ppm) in innermost layer |  | — | — |
| Ra (µm) of surface of innermost layer |  | 0.15 | 0.15 |
| Amount of lubricant (µg/cm²) existing on outer layer surface |  | 0.10 | 0.10 |
| Amount of lubricant (µg/cm²) existing on innermost layer surface |  | 0.15 | 0.15 |
| coefficient of dynamic friction of surface of innermost layer |  | 0.15 | 0.15 |
| Evaluation | Formability | ◎ | ◎ |
|  | Presence or absence of white powder | ○ | ○ |
|  | Presence or absence of whitening during shaping | ◎ | ◎ |

In Examples 1 to 18, Comparative Example 1, and Reference Examples 1 to 3, the elastomer-modified olefin-based resin is composed of an EPR modified homopolypropylene and an EPR modified product of an ethylene-propylene random copolymer. The EPR means ethylene-propylene rubber.

In Tables, the following abbreviations indicate the following resins, respectively.

"Random PP": ethylene-propylene random copolymer
"Block PP": elastomer-modified olefin-based resin (polypropylene block copolymer)
"AB agent": anti-blocking agent
"Philips": Phillips catalyst
"Ziegler": Ziegler catalyst
"Peroxide": peroxide catalyst
"Slurry": slurry loop process Evaluation was performed on each packaging material for a power storage device obtained as described above based on the following evaluation method. The results are shown in Tables 1 and 4. The dynamic friction coefficient of the surface of the innermost layer described in Tables 1 to 4 is a dynamic friction coefficient measured on the surface 7a of the innermost layer of each packaging material according to JIS K7125-1995.

<Method of Measuring the Center Line Average Roughness Ra of the Surface of the Innermost Layer of the Packaging Material>

In accordance with JIS B0601-2001, the center line average roughness Ra of the surface of the innermost layer of each packaging material for a power storage device was measured using "SURFTEST SV600" manufactured by Mitutoyo Corporation.

<Evaluation Method of the Amount of the Lubricant Existing on the Surface of the Innermost Layer of the Packaging Material>

From each packaging material for a power storage device, two rectangular test pieces of 100 mm in length and 100 mm in width were cut out, and then these two test pieces were overlapped and the peripheries of the sealant layers were heat-sealed at the heat-sealing temperature of 200° C. to prepare a bag body. 1 mL of acetone was injected into the internal space of this bag body using a syringe and left for 3 minutes in a state in which the surface 7a of the innermost layer 7 of the sealant layer was in contact with acetone, and then the acetone in the bag body was extracted. The amount of the lubricant ($\mu g/cm^2$) existing on the surface of the innermost layer of the packaging material was obtained by measuring and analyzing the amount of the lubricant contained in the extracted liquid using a gas chromatograph. That is, the amount of the lubricant per 1 $cm^2$ of the surface of the innermost layer was obtained.

<Evaluation Method of the Amount of the Lubricant Existing on the Surface of the Outer Layer of the Packaging Material>

The amount of the lubricant ($\mu g/cm^2$) existing on the surface of the outer layer of the packaging material was determined in the same manner as in the aforementioned "method of evaluating the amount of the lubricant existing on the surface of the innermost layer" except that the bag body was produced such that the outer layer was arranged at the inside of the bag body so that the surface of the outer layer and the acetone were in contact with each other. That is, the amount of the lubricant per 1 $cm^2$ of the surface of the outer layer was obtained.

<Formability Evaluation Method>

Using a forming-depth free straight die, deep drawing one stage forming was performed on a packaging material under the following shaping conditions. Formability was evaluated for each forming depth (9 mm, 8 mm, 7 mm, 6 mm, 5 mm, 4 mm, 3 mm, 2 mm). The maximum forming depth (mm) at which good forming could be performed without generating pinholes at the corner portion was investigated. In the judgment, "⊚" was denoted as those having a maximum forming depth of 6 mm or more, a product having a maximum forming depth of 4 mm or more and less than 6 mm was denoted as "◯", and a sample having a maximum forming depth of less than 4 mm was denoted as "×". The presence or absence of pinholes was examined by visually observing the presence or absence of the transmitted light transmitted through the pinhole.

(Forming Conditions)

Forming die . . . Punch: 33.3 mm×53.9 mm, die: 80 mm×120 mm, corner R: 2 mm, punch R: 1.3 mm, die R: 1 mm Brake holding pressure . . . Gauge pressure: 0.475 MPa, Actual pressure (calculated value): 0.7 MPa Material . . . SC (carbon steel) material, chrome plating only for the punch R.

<Evaluation Method for Presence or Absence of White Powder>

From each packaging material for a power storage device, a rectangular test piece with a length of 600 mm×a width of 100 mm was cut out, and the obtained test piece was placed on a test bed with the surface of the inner sealant layer (that is, the surface 7a of the innermost layer) facing upward and a black SUS weight (mass: 1.3 kg, the size of the ground contact surface: 55 mm×50 mm) wrapped with a black waste cloth was placed on the upper surface of the test piece. In this state, the weight was pulled and moved by the length of 400 mm in the contact state of being contacted on the upper surface of the test piece by pulling the weight in the horizontal direction parallel to the upper surface of the test piece at a tensile speed 4 cm/sec. The waste cloth (black) on the contact surface of the weight after the tension movement was visually observed. A sample in which white powder remarkably appeared on the surface of the waste cloth (black) was denoted as "×", and a sample in which white powder was slightly appeared was denoted as "Δ", and a sample in which there was almost no white powder or no white powder was observed was denoted as "◯". As the black waste cloth, "static eliminating sheet S SD2525 3100" manufactured by TRUSCO Co., Ltd. was used.

<Evaluation Method for Presence or Absence of Whitening at the Time of Shaping>

Using a deep drawing tool manufactured by Amada Co., Ltd., deep drawing was performed to a packaging material into a rectangular parallelepiped shape having a depth of 5 mm under the following shaping conditions, and then the inner surface (the surface of the sealant layer 3) of the accommodation recess of the obtained shaped article. The presence or absence and the extent of whitening were evaluated based on the following criteria by visual observation.

(Judgment Criteria)

The shaped body after shaping was visually observed, and a shaped body in which no whitening was observed or almost no whitening was observed was denoted as "⊚", a shaped body in which whitening was small was denoted as "◯", a shaped body in which whitening was occurred to some extent was denoted as "Δ", and a shaped body in which whitening was occurred conspicuously was denoted as "×".

(Shaping Conditions)

Shaping die . . . Punch: 33.3 mm×53.9 mm, die: 80 mm×120 mm, corner R: 2 mm, punch R: 1.3 mm, die R: 1 mm Brake holding pressure . . . Gauge pressure: 0.475 MPa, Actual pressure (calculated value): 0.7 MPa Material . . . SC (carbon steel) material, chrome plating only for punch R.

As is apparent from the table, the packaging materials for a power storage device of Examples 1 to 18 of the present invention are excellent in formability and hardly exhibit white powder on the surface of the packaging material, and furthermore whitening hardly occurred at the time of shaping.

On the other hand, Comparative Example 1 not containing roughening material was inferior to formability. Also, in order to obtain a good evaluation with a structure not containing a roughening material, it is necessary to increase the lubricant content rate in the sealant layer as in Reference Examples 1 to 3 and contain the anti-blocking agent (AB agent) in the innermost layer at a large content rate. In cases where a large amount of the anti-blocking agent is contained in the innermost layer, the anti-blocking agent is pushed into the inner side when the packaging material is wound up, slipperiness becomes likely to decrease and the anti-blocking agent become likely to drop. In Reference Example 3 in which the lubricant content rate in the sealant layer is the largest, white powder remarkably appeared on the surface of the packaging material.

INDUSTRIAL APPLICABILITY

A packaging material for a power storage device manufactured using a sealant film according to the present invention and a packaging material for a power storage device according to the present invention can be used as a packaging material for various power storage devices. The specific examples therefore include a power storage device such as a lithium secondary battery (a lithium ion battery, a lithium polymer battery, etc.), a lithium-ion capacitor, an electric double layer capacitor, and an all solid battery. Examples of the power storage device according to the present invention include various power storage devices exemplified above.

The present application claims priority to Japanese Patent Application No. 2016-212823 filed on Oct. 31, 2016, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

DESCRIPTION OF REFERENCE SYMBOLS

1: packaging material for a power storage device
2: heat resistant resin layer (outer layer)
3: sealant layer (inner layer)
4: metal foil layer
5: 2 adhesive layer (outer adhesive layer)
6: 1 adhesive layer (inner adhesive layer)
7: innermost layer
7a: surface of the innermost layer of the sealant layer
8: first intermediate layer
9: 2 intermediate layer
10: packaging case for a power storage device (shaped body)
15: packaging material
30: power storage device
31: power storage device main body

The invention claimed is:

1. A packaging material for a power storage device, comprising:
a heat resistant resin layer as an outer layer;
a sealant layer as an inner layer; and
a metal foil layer arranged between the heat resistant resin layer and the sealant layer, wherein
the sealant layer is composed of one layer or a plurality of layers, and an innermost layer of the sealant layer contains a random copolymer containing propylene as a copolymerization component and another copolymerization component other than propylene, a roughening material, and a lubricant,
the roughening material is composed of particles containing a thermoplastic resin, and
a center line average roughness Ra of a surface of the innermost layer is 0.05 µm to 1 µm,
wherein the roughening material in a dispersed state has an average particle diameter of 0.05 µm to 10 µm, and,
wherein the packaging material has formability,
wherein the thermoplastic resin constituting the roughening material is a high-density polyethylene resin, and
wherein a density of the high-density polyethylene resin is 0.935 g/cm$^3$ to 0.965 g/cm$^3$, and a melt flow rate of the high-density polyethylene resin at 190° C. is within a range of 0.01 g/10 min to 2 g/10 min.

2. The packaging material for a power storage device as recited in claim 1, wherein
the lubricant is one or more lubricants selected from the group consisting of fatty acid amide, wax, silicone, and paraffin.

3. A packaging case for a power storage device, the packaging case being composed of a shaped body of the packaging material for a power storage device as recited in claim 1.

4. A power storage device comprising:
a power storage device main body; and
a packaging material composed of the packaging material for a power storage device as recited in claim 1,
wherein the power storage device main body is packaged by the packaging material.

5. A packaging material for a power storage device, comprising:
a heat resistant resin layer as an outer layer;
a sealant layer as an inner layer; and
a metal foil layer arranged between the heat resistant resin layer and the sealant layer, wherein
the sealant layer is composed of one layer or a plurality of layers, and an innermost layer of the sealant layer contains a random copolymer containing propylene as a copolymerization component and another copolymerization component other than propylene, a roughening material, and a lubricant,
the roughening material is composed of particles containing a thermoplastic resin, and
a center line average roughness Ra of a surface of the innermost layer is 0.05 µm to 1 µm,
wherein the roughening material in a dispersed state has an average particle diameter of 0.05 µm to 10 µm, and,
wherein the packaging material has formability, and
wherein the roughening material in the innermost layer of the sealant layer is present in an amount from 1 mass % to 30 mass %, and the lubricant in the innermost layer in an amount which exceeds 0 ppm and is equal to or less than 1,000 ppm.

6. The packaging material for a power storage device as recited in claim 5, wherein
the lubricant is one or more lubricants selected from the group consisting of fatty acid amide, wax, silicone, and paraffin.

7. A packaging case for a power storage device, the packaging case being composed of a shaped body of the packaging material for a power storage device as recited in claim 5.

8. A power storage device comprising:
a power storage device main body; and
a packaging material composed of the packaging material for a power storage device as recited in claim 5,
wherein the power storage device main body is packaged by the packaging material.

9. A packaging material for a power storage device, comprising:
a heat resistant resin layer as an outer layer;
a sealant layer as an inner layer; and
a metal foil layer arranged between the heat resistant resin layer and the sealant layer, wherein
the sealant layer is composed of one layer or a plurality of layers, and an innermost layer of the sealant layer contains a random copolymer containing propylene as a copolymerization component and another copolymerization component other than propylene, a roughening material, and a lubricant,
the roughening material is composed of particles containing a thermoplastic resin, and
a center line average roughness Ra of a surface of the innermost layer is 0.05 μm to 1 μm,
wherein the roughening material in a dispersed state has an average particle diameter of 0.05 μm to 10 μm, and,
wherein the packaging material has formability,
wherein the sealant layer is composed of a plurality of layers, and
wherein the sealant layer includes the innermost layer, a first intermediate layer laminated on a surface of the innermost layer on a side of the metal foil layer, and a second intermediate layer laminated on a surface of the first intermediate layer on a side of the metal foil layer,
the first intermediate layer contains an elastomer-modified olefin-based resin,
the elastomer-modified olefin-based resin is composed of elastomer-modified homopolypropylene and/or an elastomer-modified random copolymer,
the elastomer-modified random copolymer is an elastomer modified product of a random copolymer containing propylene as a copolymerization component and another copolymerization component other than propylene, and
the second intermediate layer contains a random copolymer containing propylene as a copolymerization component and another copolymerization component other than propylene.

10. The packaging material for a power storage device as recited in claim 9, wherein
the lubricant is one or more lubricants selected from the group consisting of fatty acid amide, wax, silicone, and paraffin.

11. The packaging material for a power storage device as recited in claim 9, wherein
the sealant layer includes the innermost layer and a first intermediate layer laminated on a surface of the innermost layer on a side of the metal foil layer,
the first intermediate layer contains an elastomer-modified olefin-based resin,
the elastomer-modified olefin-based resin is composed of elastomer-modified homopolypropylene and/or an elastomer-modified random copolymer, and
the elastomer-modified random copolymer is an elastomer modified product of a random copolymer containing propylene as a copolymerization component and another copolymerization component other than propylene.

12. The packaging material for a power storage device as recited in claim 9, wherein
the lubricant is one or more lubricants selected from the group consisting of fatty acid amide, wax, silicone, and paraffin.

13. A power storage device comprising:
a power storage device main body; and
a packaging material composed of the packaging material for a power storage device as recited in claim 9,
wherein the power storage device main body is packaged by the packaging material.

* * * * *